United States Patent Office 2,922,211
Patented Jan. 26, 1960

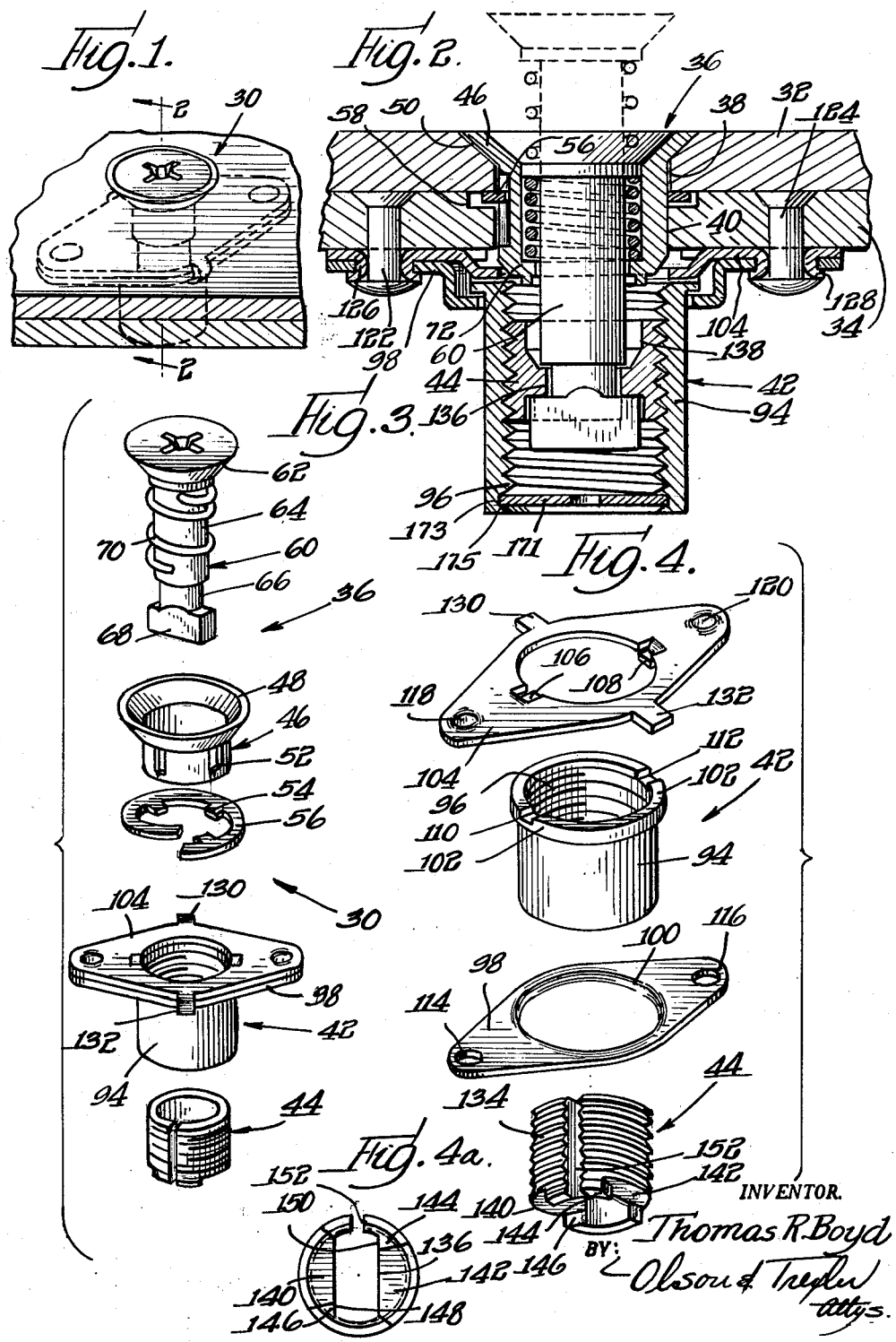

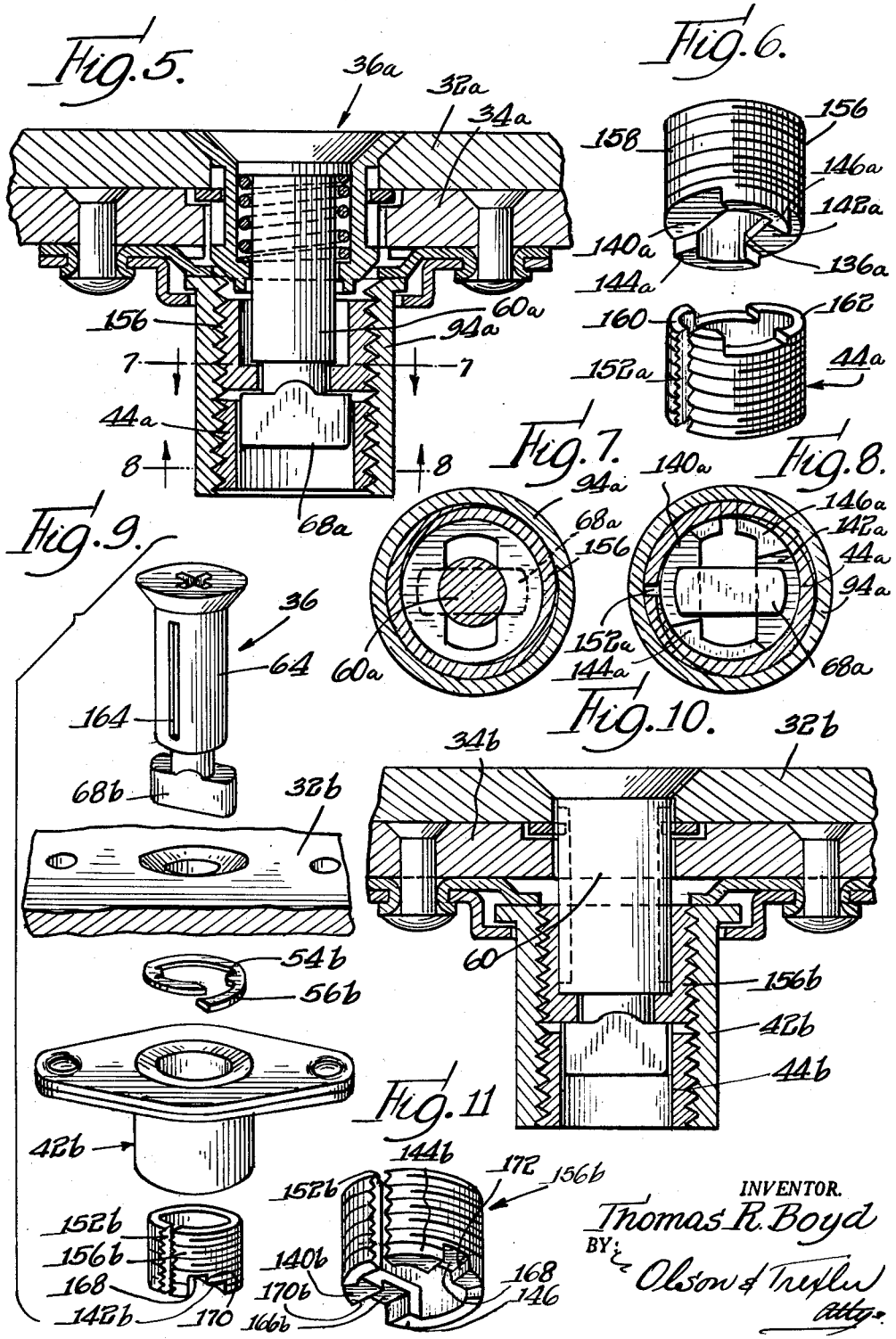

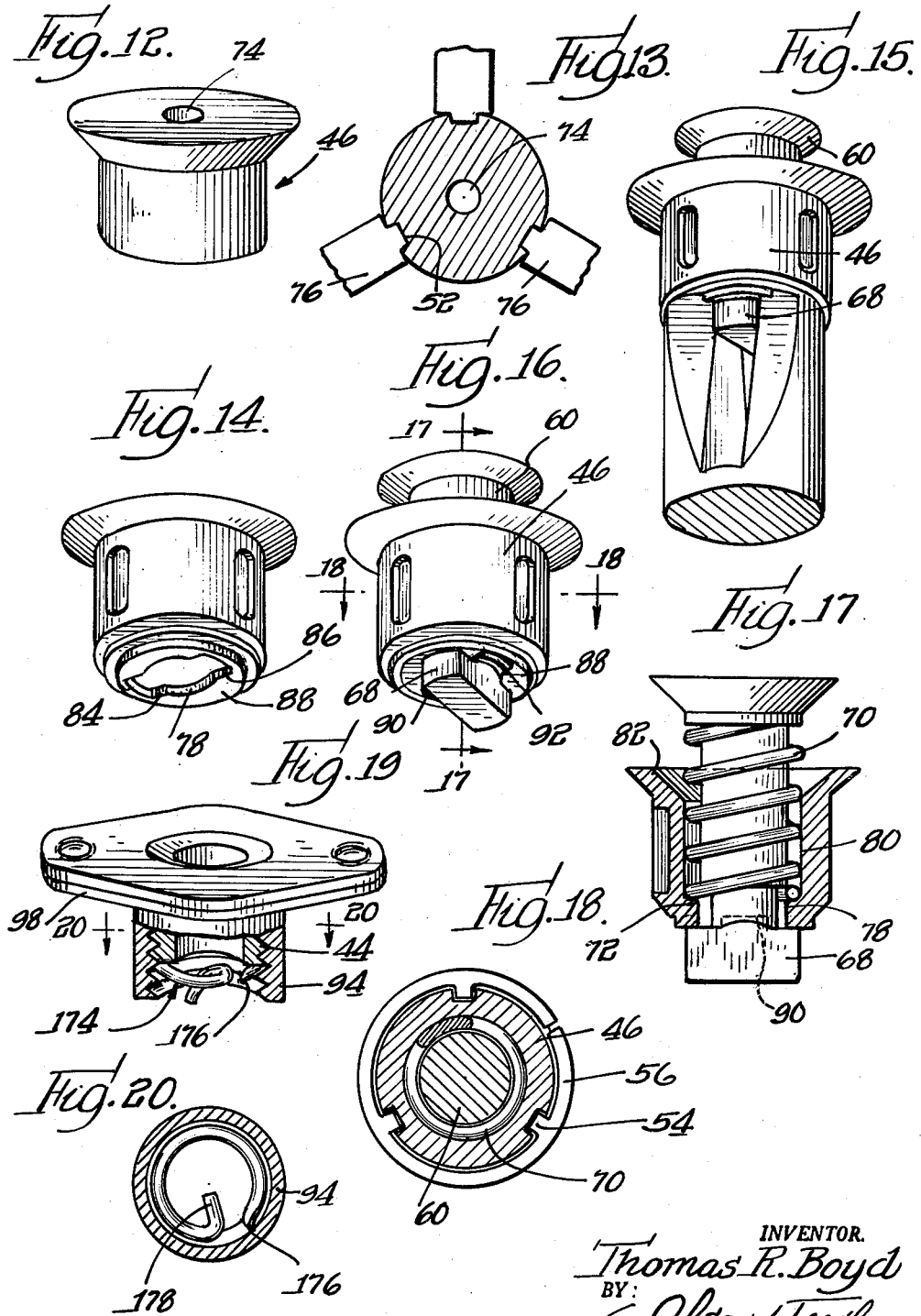

2,922,211

QUICK FASTENER UNIT

Thomas R. Boyd, Park Ridge, Ill., assignor to Illinois Tool Works, Chicago, Ill., a corporation of Illinois Application October 4, 1955, Serial No. 538,339

6 Claims. (Cl. 24—221)

The present invention relates to fastening devices adapted to connect a plurality of apertured workpieces, and more particularly to novel quick fasteners of the type often referred to as cowl fasteners.

While various uses for the fasteners of the present invention will suggest themselves, it is contemplated that the fasteners are especially useful in installations wherein they may be subjected to high shear stresses as well as considerable axial stresses. It is an important object of the present invention to provide a novel quick fastener capable of withstanding high shear stresses, which fastener has improved holding power and may be more economically produced than fasteners of the same general type previously proposed. A fastener incorporating the features of the present invention includes stud means adapted to be inserted through a plurality of apertured workpieces and receptacle means adapted to be connected with one of the workpieces for receiving the stud means, and it is another object of the present invention to provide such a quick fastener with a novel threaded locking member cooperable with the stud means and adapted to engage a complementary threaded member so that a substantially uniform locking engagement is obtained between substantially all portions of the locking member threads and the complementary member whereby improved locking action is obtained and any possibility of galling of the threads as a result of uneven pressures is substantially reduced.

Another object of the present invention is to provide a novel quick fastener of the above described type which may be readily adjusted for securing various assemblies of apertured workpieces having different overall thicknesses together.

A more specific object of the present invention is to provide a novel quick fastener of the above described type wherein the receptacle means may be easily and economically fabricated from a plurality of simple parts which may be formed from sheet material, if desired.

Another specific object of the present invention is to provide a novel method of making a strain relief grommet for a fastener of the above described type whereby substantial savings in manufacturing costs may be effected as compared with previous methods of producing somewhat similar grommets.

Other objects and advantages of the present invention will become apparent from the following description and the accompanying drawings wherein:

Fig. 1 is a perspective view showing a quick fastener embodying the principles of the present invention assembled with a pair of apertured workpieces;

Fig. 2 is an enlarged cross sectional view taken along line 2—2 in Fig. 1;

Fig. 3 is an exploded perspective view of a pick fastener embodying the principles of this invention;

Fig. 4 is an exploded perspective view of the novel means for receiving and securing the stud;

Fig. 4a is an end view of the locking element or nut;

Fig. 5 is a sectional view showing a modified form of the present invention;

Fig. 6 is an exploded perspective view showing cooperating stud locking elements of the fastener shown in Fig. 5;

Fig. 7 is a cross sectional view taken along line 7—7 in Fig. 5;

Fig. 8 is a cross sectional view taken along line 8—8 in Fig. 5;

Fig. 9 is an exploded perspective view showing another modified form of the present invention;

Fig. 10 is a cross sectional view showing the fastener of Fig. 9 applied to a pair of apertured workpieces or panels;

Fig. 11 is a perspective view showing the novel stud locking member utilized in the embodiment of Fig. 9, which locking member may be substituted for the corresponding locking member of the embodiment shown in Figs. 1 through 4, if desired;

Fig. 12 is a perspective view showing a blank from which a grommet used in the fastener assemblies of Figs. 1 through 8 may be formed;

Fig. 13 is a fragmentary sectional view showing the method of forming elongated recesses in the peripheral surface of the grommet blank in accordance with the present invention;

Fig. 14 is a perspective view showing the grommet blank processed sufficiently for receiving a stud member;

Fig. 15 is a perspective view showing the manner in which a portion of a deformable annular protuberance at the end of the grommet may be peened over so as to prevent axial separation of the stud from the grommet;

Fig. 16 is a perspective view showing the completed stud and grommet assembly;

Fig. 17 is a sectional view taken along line 17—17 in Fig. 16;

Fig. 18 is a sectional view taken along line 18—18 in Fig. 16;

Fig. 19 is a perspective view partially broken away showing a receptacle means of the present invention having a locking element threaded thereinto and particularly showing a stop member disposed within the receptacle means for limiting axial movement of the locking element; and Fig. 20 is a cross sectional view taken along line 20—20 in Fig. 19.

Referring now more specifically to the drawings wherein like parts are designated by the same numerals throughout the various figures, a fastener 30 embodying one form of the present invention is shown in Figs. 1 through 4, which fastener is adapted to secure an apertured workpiece or panel 32 to a second apertured workpiece or panel 34. In general the fastener 30 includes stud means 36 adapted to project through apertures 38 and 40 in the workpieces, receptacle means 42 adapted to be mounted to the innermost workpiece, and a locking element 44 disposed within the receptacle means for retaining the stud means against unauthorized retrograde movement.

The stud means 36 comprises a grommet 46 for snugly fitting within the workpiece apertures and absorbing shear stresses applied to the fastener. Preferably, the grommet has a flared head portion 48 adapted to seat within a countersunk portion 50 of the workpiece aperture 38. One or more grooves 52 are formed in the peripheral surface of the grommet and extend generally axially thereof for receiving projections 54 of a retaining washer 56. As shown in Fig. 2 the retainer washer is adapted to be disposed beneath the outer workpiece 32 for retaining the grommet in assembled relationship with this workpiece. Preferably, the workpiece 34 is relieved as at 58 for accommodating the retaining washer.

A stud member 60 is assembled with the grommet in the manner to be described below which stud has a flared outer end head portion 62 adapted to seat within the flared head portion of the grommet and a shank 64 extending axially from the head portion. The shank is provided with a reduced diameter portion 66 adjacent its entering end and transversely extending pin means 68 is integrally or otherwise joined to the end of the reduced diameter portion 66 for cooperating with the locking member 44. Preferably, means is provided for ejecting the stud at least partially from the grommet after the stud has been disengaged from the locking element 44, and this means includes a helical spring 70 disposed on the shank 64 and adapted to be compressed between an internal shoulder 72 at the entering end of the grommet and the head portion of the stud. The method by which the grommet is formed and the stud is assembled therewith is shown best in Figs. 12 through 18. More specifically, a substantially solid blank is first provided as shown in Fig. 12, which blank may have a relatively small aperture 74 therein for centering purposes. Then the generally axially extending grooves 52 are swaged in the peripheral wall of the substantially solid blank by means of suitable tools 76 as shown in Fig. 13. Heretofore, it has been proposed that such grooves be formed by cutting away the material of the grommet, but it has been found that very substantial savings in manufacturing costs may be obtained by swaging the grooves in the substantially solid blank. After the grooves 52 have been swaged into the blank, a bore 78 is provided through the blank for permitting passage of the stud shank, and a counterbore 80 is formed to receive the coil spring 70 and to provide the internal shoulder 72. In addition, the head portion of the blank is countersunk as at 82 for receiving the head portion of the stud. As shown best in Fig. 14, slots 84 and 86 are provided through the shoulder portion 72 for permitting the pin means of the stud to pass therethrough when the stud is in one position. A deformable annular protuberance 88 is provided at the end of the grommet, which protuberance is upset or swaged inwardly at areas 90 and 92 adjacent the ends of the slots 84 and 86 after the pin means has been inserted through the slots as shown in Fig. 15 so that the slots are restricted and the stud is prevented from becoming disassembled from the grommet.

As shown in Figs. 2, 3 and 4 the receptacle means is fabricated from a plurality of parts which may be formed from sheet metal relatively simply and economically. More specifically, a tubular member 94 is provided for receiving the locking element 44 and the entering end of the stud, which tubular member is provided with internal helical threads 96 and may be formed from a tube of sheet metal or may be formed from barstock, if desired. A base or attachment plate 98 is provided for adapting the tubular member to be mounted to the under surface of the innermost workpiece 34, which plate has a central embossed apertured portion 100 for accommodating an annular flange 102 at the attachment end of the tubular member. In order to retain the tubular member in preassembled relationship with the base or attachment plate 98, a second base or attachment plate 104 is provided which is adapted to overlie the plate 98 and the flange 102 of the tubular member. Interlocking means is provided between the tubular member and the base plates to prevent the tubular member from rotating, and in the embodiment illustrated, this interlocking means includes tabs 106 and 108 struck downwardly from the plate 104 and projecting into notches 110 and 112 respectively in the flange 102 of the tubular member. The base plates are respectively provided with apertures 114—116 and 118—120 for receiving rivets 122 and 124 or other suitable fastening devices which are used to secure the receptacle means to the workpiece 34. The apertures 118 and 120 in the plate member 104 are defined by annular protuberances 126 and 128 which extend through the apertures 114 and 116 respectively in the plate 98 and are peened outwardly, as shown in Fig. 2, for retaining the attachment plates together.

As will be understood, considerable axial pressure is often applied to the receptacle means during initial assembly of the stud with the locking element, which pressure may cause the central portion of the base plate 98 to flex away from the central portion of the plate 104 sufficiently to permit the tabs 106 and 108 to be disengaged from the slots 110 and 112. In order to prevent such axial deflection of the plate member 98, a relatively heavy gauge sheet metal may be used or preferably, means is provided for interconnecting the mid-portion of the plate 98 with the mid-portion of the plate member 104. In the embodiment illustrated, this means comprises a pair of tabs 130 and 132 extending from the plate member 104 around marginal portions of the plate member 98.

As shown best in Fig. 2 the receptacle 94 is loosely retained so that it has a limited amount of float with respect to the plate members 98 and 104. This facilitates entry of the stud member into the receptacle even though there is a slight misalignment between the stud member and the plate members. As will be understood, this will be particularly advantageous in installations where a number of the fastening devices is applied to the workpiece.

The locking element or nut member 44 is provided with external threads 134 and is threaded into the hollow member 94 of the receptacle means for cooperating with the stud. A transverse slot 136 is formed in the locking element, which slot has a width slightly greater than the diameter of the reduced portion 66 of the stud and the width of the pin means 68 so that the pin means may be passed therethrough as shown in Fig. 2. A counterbore 138 is also provided in the locking element for accommodating the larger diameter portion of the stud shank. Locking surfaces 140 and 142 are provided at the end of the locking member facing generally away from the attachment end of the receptacle means for engaging the pin means of the stud after the pin means has been inserted through the slot 136 and the stud has been rotated slightly relative to the locking member. A pair of shoulder elements or lugs 144 and 146 extend axially from the locking surfaces for engagement with opposite ends of the pin means after the pin means has been inserted through the slot 136 and rotated into overlying relationship with respect to the locking surfaces. Thus, after engagement of the pin means with the abutment elements, further rotation of the stud causes the locking member to rotate therewith and shift axially within the receptacle means away from the workpieces so that the stud is drawn tightly against the workpieces. When the stud has been fully tightened, aggressive frictional engagement between the pin means and the locking surfaces 140 and 142 prevents unauthorized retrograde rotation of the stud. However, an operator may quickly remove the stud by turning it in a reversed direction about 90° so that the pin means is aligned with the slot 136 whereupon the spring 70 will eject the stud from the locking member. Usually it is desirable to retract the locking member toward the workpieces while the stud is being removed therefrom so as to facilitate re-application of the stud thereto. Therefore, the abutment elements or lugs 144 and 146 are provided with surfaces 148 and 150 which are engageable with the pin means when the pin means is aligned with the slot 136 and during retrograde rotation thereof.

In accordance with the present invention, the locking member 44 is formed so that the threads thereof initially have an outside diameter which is slightly greater than the maximum diameter of the receptacle threads 96, and the body of the locking member is generally axially split as indicated at 152. When the locking member is assembled within the tubular member 94, it is radially compressed so as to reduce the diameter thereof, and in addition, it is helically twisted so as to align substantially the ends of its split helical thread segments. The inherent resiliency of the locking member material which is preferably steel tends to return the locking member to its original unstressed condition so that the thread segments thereof are continuously and aggressively urged into locking frictional engagement with the threads of the tubular member 94. This locking action prevents unauthorized retrograde movement of the locking member within the receptacle means, which movement, if permitted, would reduce or eliminate the locking engagement of the surfaces 140 and 142 with the pin means of the stud. It should be noted that with the locking member split and formed in the manner just described, the thread segments thereof are substantially uniformly urged into engagement with the receptacle means threads throughout their entire length so that maximum locking action is obtained and so that any possibility of the threads becoming galled as a result of uneven pressures is substantially reduced.

In many installations it is desirable to prevent moisture, dirt, or other foreign material from entering the tubular member of the receptacle means. In such cases, a sheet material cap, not shown, may be assembled over the free end of the tubular receptacle member 94 and retained thereon by a press fit or in any other desired manner. It also may be desirable in some installations to provide a pressure seal, not shown, for preventing the passage of air, gases, or foreign material through the work aperture and the fastening device.

In Figs. 5 through 8, there is shown a modified form of the present invention which is similar to the above described structure as indicated by the application of identical reference numerals with the suffix "a" added to corresponding elements. This embodiment differs only in that the stud locking means has been modified so as to obtain improved ability to withstand axially directed stresses. More specifically, in this embodiment the locking means includes, in addition to the split locking member 44a, a locking member 156 having threads 158 thereon which are accurately formed for substantially full depth contact with the complementary threads of the receptacle means member 94a. The member 156 is provided with an elongated slot 136a through which the pin means 68a of the stud may be inserted, and in this embodiment the locking surfaces 140a and 142a are provided on the member 156 for engagement with the pin means. Abutment elements 144a and 146a are also provided on the member 156 to provide a driving connection between this member and the stud pin means. In this embodiment, the locking member 44a is provided with lugs 160 and 162 which extend between the abutment elements or lugs 144a and 146a so that the members 44a and 156 are interconnected with each other for rotation as a unit. Thus, the member 44a serves to prevent unauthorized retrograde rotation of the member 156, and the member 156 serves to lock the stud and provide the fastener with great resistance to axially directed forces tending to separate the workpieces.

Figs. 9, 10 and 11 show another embodiment of the present invention which is similar to the above described structures as indicated by the application of identical reference numerals with the suffix "b" added to corresponding elements. In this embodiment, the fastener has been simplified by omitting the grommet and ejector spring, and the diameter of the stud shank is such that the stud fits snugly within the workpiece apertures and directly absorbs any shear stresses. In order to retain the stud in assembled relationship with the workpiece 32b, grooves 164 similar to the above described grooves 52 in the grommet are swaged in the peripheral surface of the stud shank for cooperation with projections 54b on a retaining washer 56b.

In certain installations it is desirable to provide the locking element or nut member of the fastener with means for positively retaining the stud member against unauthorized retrograde rotation relative thereto and the locking element 156b is formed to accomplish this result. It is understood that the locking element may, if desired, be substituted for the above described locking element 44 in the fastener shown in Figs. 1 through 4. In order positively to lock the stud against unauthorized retrograde rotation, the locking element or nut 156b is provided with notches 166 and 168 in its locking surfaces 140b and 142b. These notches are located to receive the pin means of the stud when the pin means are in engagement with the abutment elements or lugs 144b and 146b. When the fastener is fully assembled with the work as shown in Fig. 10, the edges 170 and 172 of the notches positively retain the pin means against unauthorized retrograde rotation, and in order to remove the stud means from the locking element, it is necessary for an operator to turn the stud until the locking element has been retracted sufficiently to permit the pin means to clear the edges 170 and 172 and pass over the locking surfaces into alignment with the slot 136b.

If an inexperienced or careless operator turns the studs of any of the above described fasteners before the pin means thereof has passed entirely through the elongated slot in the locking means, the locking means could be rotated and shifted away from the workpieces until it becomes completely disengaged from the stud so that it is no longer possible to turn the locking means in either direction. If this should occur it would be necessary to remove the outer workpiece and the stud assembly from the inner workpiece and insert a tool such as a screwdriver or the like into the receptacle and turn the locking member backward until it could again be engaged by the pin means of the stud. Therefore, stop means may be provided in the internally threaded receptacle members of the above described fasteners for limiting the possible movement of the locking means away from the attachment end of the receptacle means, and such a stop is shown in Figs. 2 and 3. This means includes a disc 171 seated within a counterbore 173 in the end of the receptacle 94. The receptacle is peened over as at 175 to retain the disc. This disc 171 may be provided with an aperture therethrough as shown to permit dirt and moisture to escape from the receptacle.

Another stop means is shown in Figs. 19 and 20 and this stop means includes a helically formed wire 174 threaded into the receptacle member 94 to the desired adjusted position. One end of the wire is formed with a tooth or spur 176 for biting into the receptacle member and preventing unauthorized adjustment of the wire. The opposite end of the wire terminates in an inwardly directed arm 178 which may be easily engaged by a suitable tool for adjusting the stop member or wire within the receptacle means.

While the preferred embodiments of the present invention have been shown and described herein, it is obvious that many structural details may be changed without departing from the spirit and scope of the appended claims.

The invention is claimed as follows:

1. A quick fastener for connecting a plurality of apertured workpieces comprising a grommet insertable into aligned apertures of a pair of workpieces and having an enlarged head portion engageable with an outermost workpiece, said grommet having generally axially disposed groove means swaged in a peripheral surface thereof and extending from adjacent said head portion and terminating short of its entering end, retaining means having projection means extending into said groove means and adapted to be positioned beneath said outermost panel for retaining the grommet in assembled relationship with the outermost panel, a stud extending through said grommet and insertable through the workpiece apertures and including transversely extending pin means adjacent its entering end, internally threaded receptacle means having attachment means adjacent one end thereof adapted to be connected to an inwardly disposed workpiece, an externally threaded locking means threaded into said receptacle means and having a non-circular opening therethrough for permitting said pin means to be passed therethrough when said stud is in one position, said locking means including a locking surface facing generally away from the attachment end of said receptacle means for engaging said pin means when the pin means is inserted through said opening and the stud is turned from said one position, said locking means including shoulder means disposed axially of said surface away from said attachment means engageable with said pin means so that the locking means may be rotated relative to the receptacle means upon substantial rotation of the stud from said one position to shift said locking means within said receptacle means away from said attachment end and thereby shift said locking surface into locking engagement with said pin means, and said locking means including a resilient portion completely axially split between opposite free terminal ends thereof and initially having a non-deformed circular configuration having a diameter greater than the internal diameter of said receptacle means and being in a stressed condition within said receptacle means so that thread segments thereof are substantially entirely uniformly biased into frictional rotation resisting engagement with receptacle means threads to prevent unauthorized retrograde movement of the locking means.

2. A quick fastener as claimed in claim 1, wherein the locking surface includes a notch extending toward the attachment end of the receptacle means for receiving the pin means when the pin means is in engagement with the shoulder means.

3. A quick fastener as claimed in claim 1, which includes a stop member secured within said receptacle means for preventing said locking means from being shifted axially away from the attachment end of the receptacle means sufficiently to prohibit engagement of said pin means with said shoulder means.

4. A quick fastener as claimed in claim 3, wherein said stop member comprises a disc seated in the end of the receptacle means remote from the attachment end thereof.

5. A quick fastener for connecting inner and outer apertured workpieces comprising a stud insertable through the workpiece apertures and having transversely disposed pin means extending from an entering end portion thereof, a grommet on said stud for entering the workpiece apertures and having an enlarged end overlying the outer workpiece and a shank portion, said grommet having generally axially disposed groove means swaged in a peripheral surface thereof and extending from adjacent said enlarged end and terminating short of an entering end of said shank portion, retaining means having projection means extending into said swaged groove means and adapted to be positioned beneath said outer workpiece for retaining the grommet in assembled relationship thereto, an internally threaded receptacle of predetermined internal diameter having laterally extending annular flange means at an end thereof to be positioned adjacent an undersurface of the inner workpiece, first and second attachment plate members adapted to be secured to the inner workpiece and respectively having apertured portions extending over and beneath said flange means for retaining the receptacle, an externally threaded locking member having a transversely elongated axially extending aperture therein through which said pin means may pass, said locking member having a first pair of oppositely disposed relatively thin axially extending wall portions and a second pair of oppositely disposed relatively thick axially extending wall portions defining said last mentioned aperture, said locking member having locking surfaces interrupted by said last mentioned aperture and defining ends of said thick wall portions and facing away from the workpieces, said locking member including abutment means extending axially outwardly of said surfaces, said pin means being engageable with said locking surfaces for preventing withdrawal of the stud and also being engageable with said abutment means when it overlies said locking surfaces so that the locking member may be rotated upon rotation of the stud, and one of said thin wall portions of said locking member extending the entire length of the locking member and being axially split throughout the entire length thereof and initially having a non-deformed circular configuration and a diameter throughout its length greater than the internal diameter of the receptacle so that the locking member is resiliently compressed within the receptacle and lockingly engages the receptacle threads.

6. A quick fastener for connecting a plurality of apertured workpieces comprising a stud insertable through the workpiece apertures, and including transversely extending pin means adjacent its entering end, and an internally threaded tubular member having a narrow peripheral flange at one end thereof, notch means in said flange, an elongated sheet metal apertured member receiving said tubular member and abutting one side of said flange, a second elongated sheet metal apertured member overlying said first mentioned sheet metal member and said flange, means interconnecting said sheet metal members for trapping the flange therebetween, tab means on one of said sheet metal members extending into said notch means for preventing said tubular member from rotating relative to said sheet metal members, said sheet metal members having aligned apertures adjacent opposite ends thereof for receiving means for connecting them to a workpiece, said apertures in one of said sheet metal members being defined by protuberance means extending through the apertures in the other of said sheet metal members and peened outwardly for connecting said sheet metal members together, and one of said sheet metal members including tab means adjacent a mid-portion thereof interengaging a mid-portion of the other of said sheet metal members for preventing axial separation of said mid-portions to insure continuous interengagement of the first mentioned tab means and said notch means which prevents the tubular member from rotating, and externally threaded hollow locking means threaded into said tubular member for receiving an entering end portion of said stud, a locking surface on said locking means facing generally away from said sheet metal members and engageable with said pin means when the locking means is shifted along said tubular member away from the workpieces for restraining retrograde movement of the stud, shoulder means on said locking means disposed axially of said surface away from said sheet metal members and engageable with said transverse pin means so that said locking means may be rotated relative to said tubular member when said pin means overlies said surface upon rotation of said stud for axially shifting the locking means, and said locking means including a resilient portion completely axially split between opposite free terminal ends thereof and initially having a non-deformed circular configuration having a diameter greater than the internal diameter of said tubular member and being in a stressed condition within said tubular member so that thread segments thereof are substantially entirely uniformly biased into frictional relative rotation resisting engagement with the tubular member threads to prevent unauthorized retrograde movement of said locking means.

References Cited in the file of this patent

UNITED STATES PATENTS

| 2,046,025 | Lee | June 30, 1936 |
| 2,381,233 | Summers | Aug. 7, 1945 |
| 2,394,104 | Rankin | Feb. 5, 1946 |
| 2,406,007 | Eisele | Aug. 20, 1946 |
| 2,426,857 | Birkenmaier | Sept. 2, 1947 |

(Other references on following page)

UNITED STATES PATENTS

| | | | |
|---|---|---|---|
| 2,469,311 | Poupitch | May 3, | 1949 |
| 2,486,411 | Huelster | Nov. 1, | 1949 |
| 2,571,641 | Wing | Oct. 16, | 1951 |
| 2,640,244 | Becker | June 2, | 1953 |
| 2,640,245 | Becker | June 2, | 1953 |
| 2,757,429 | Summers | Aug. 7, | 1956 |
| 2,817,135 | Harris et al. | Dec. 24, | 1957 |

FOREIGN PATENTS

| 599,362 | Great Britain | Mar. 10, 1948 |
|---|---|---|